(12) United States Patent
Hefeeda et al.

(10) Patent No.: US 10,134,134 B2
(45) Date of Patent: Nov. 20, 2018

(54) METHOD AND SYSTEM FOR CREATING DEPTH SIGNATURES

(75) Inventors: Mohamed Hefeeda, Doha (QA); Tarek El Gamal, Doha (QA)

(73) Assignee: QATAR FOUNDATION, Doha (QA)

(*) Notice: Subject to any disclaimer, the term of this patent is extended or adjusted under 35 U.S.C. 154(b) by 38 days.

(21) Appl. No.: 14/399,346

(22) PCT Filed: May 24, 2012

(86) PCT No.: PCT/EP2012/059779
§ 371 (c)(1),
(2), (4) Date: Nov. 6, 2014

(87) PCT Pub. No.: WO2013/174439
PCT Pub. Date: Nov. 28, 2013

(65) Prior Publication Data
US 2015/0093017 A1 Apr. 2, 2015

(51) Int. Cl.
*G06K 9/00* (2006.01)
*G06T 7/00* (2017.01)
*G06F 17/30* (2006.01)

(52) U.S. Cl.
CPC ...... *G06T 7/0022* (2013.01); *G06F 17/30799* (2013.01); *G06T 7/97* (2017.01); *G06T 2207/10012* (2013.01); *G06T 2207/20021* (2013.01); *G06T 2207/20228* (2013.01)

(58) Field of Classification Search
None
See application file for complete search history.

(56) References Cited

U.S. PATENT DOCUMENTS

| 8,171,030 | B2 | 5/2012 | Pereira et al. |
| 8,300,881 | B2 | 10/2012 | Chen et al. |
| 2008/0178302 | A1 | 7/2008 | Brock et al. |

FOREIGN PATENT DOCUMENTS

| JP | 2010057105 | 3/2010 |
| WO | WO 98/15915 | 4/1998 |
| WO | WO 99/06956 | 2/1999 |
| WO | WO 2004/006168 | 1/2004 |

(Continued)

OTHER PUBLICATIONS

Khodabakhshi et al., "Copy Detection of 3D Videos," MMSys'12, XP55034653, pp. 131-142, Feb. 24, 2012, 12 pgs.*

(Continued)

*Primary Examiner* — Fred Hu
(74) *Attorney, Agent, or Firm* — Martin & Ferraro, LLP (57) ABSTRACT

A method and system for creating a depth signature from plural images for providing watermark information related to the images. The method comprises analyzing a pair of images, each image containing a plurality of elements, identifying a first element in one of the pair of images, identifying plural elements in the other of the pair of images. The method further comprises measuring a disparity parameter between the first element and a set of the plural elements, matching the first element from the set of plural elements, the matched second element having the smallest measured disparity parameter, and computing a signature based at least in part on the measured disparity between the first and second elements.

34 Claims, 4 Drawing Sheets

(56) References Cited

FOREIGN PATENT DOCUMENTS

| WO | WO 2007/148219 | 12/2007 |
| WO | WO 2013/174439 | 11/2013 |

OTHER PUBLICATIONS

Szeliski, Richard, "Computer Vision: Algorithms and Applications," Draft, pp. i-v and 533-575, Aug. 18, 2010, 48 pages.*

Bay et al., "Surf: Speeded Up Robust Features," Computer Vision—ECCV 2006: 9th European Conference on Computer Vision, Graz, Austria, May 7-13, 2006, Proceedings, Lecture Notes in Computer Science, Jan. 1, 2006 Springer, Berlin, DE, ISBN 978-3-540-33832-1, vol. 3951, pp. 404-417, Jan. 2006, 14 pgs.

Szeliski, Richard, "Computer Vision: Algorithms and Applications," Draft, pp. i-v and 533-575, Aug. 18, 2010, 48 pgs.

International Search Report and Written Opinion of WO 2013/174439, International Application No. PCT/EP2012/059779, dated Oct. 5, 2012, 13 pages.

Kauff et al., "Depth map creation and image-based rendering for advanced 3DTV services providing interoperability and scalability," Signal Processing: Image Communication, vol. 22, No. 2, 2007, pp. 217-234.

Merkle et al., "3d video: Acquisition, coding, and display," International Conference on Consumer Electronics (ICCE), Digest of Technical Papers, 2010, pp. 127-128.

Szeliski, "Stereo correspondence," Chapter 11 In: Computer Vision, Algorithms and Applications, Aug. 18, 2008, XP55039468, pp. i-v, 533-575.

* cited by examiner

Left Image

Right Image

Figure 4

METHOD AND SYSTEM FOR CREATING DEPTH SIGNATURES

This is a National Phase Application under 35 USC 371 of PCT/EP2012/059779 filed May 24, 2012 (published on Nov. 28, 2013 as WO 2013/174439), which is incorporated herein by reference.

This invention relates to a method and system for creating depth signatures.

BACKGROUND

In stereo videos, a pair of views, two slightly different views (left and right), are displayed to a viewer and the human visual system fuses them together to perceive the depth of objects in the mentally composed single view. That is, the depth signal is not presented explicitly, but rather estimated implicitly from the difference in the views. In multi-view videos, more than two views are created for each video and each view captures a different viewing angle. Usually two views are selected for display to viewer based on his/her viewing angle. The proposed method creates depth signatures without computing the depth signal itself, which is a computationally expensive process. Thus, the new method saves substantial processing resources and it produces signatures much faster. Depth signatures created by our method can be used in several systems, including video copy detection systems, video search engines, video de-duplication systems, and video watermarking systems.

Many 3D videos are currently being created. Even some old 2D videos are being converted to 3D videos by movie studios. Significant technological advances in 3D video recording, displaying, and processing systems have been made in the past few years. Thus, it is expected that 3D equipment will become accessible to a larger customer base, which will further accelerate the creation and consumption of 3D videos.

The depth in a 3D video is emulated by presenting two slightly different views to the human eyes. The human brain fuses these two views to perceive the third dimension. Depending on the display technology, goggles may be needed to control the view seen by each eye and at what time. Different methods exist for preparing and coding 3D videos, including:

Stereo Video. The video has two views. A view can be thought of as a separate 2D video stream.

Multi-view Video. The video has multiple views and a subset of them is displayed to the user depending on the angle of viewing.

Video plus Depth. In this case, the video is encoded in 2D and a separate depth map is created for the 2D video. The depth map allows the creation of many virtual (synthesized) views, which adds flexibility and support wider viewing angles for users. Creating of virtual views, however, is computationally expensive and could introduce some visual artifacts.

Combinations and modifications of the above methods are possible, as described in "*Depth map creation and image-based rendering for advanced 3DTV services providing interoperability and scalability*" in Signal Processing: Image Communication, vol. 22, no. 2, 2007, pp. 217-234 (P. Kauff, N. Atzpadin, C. Fehn, M. Miler, O. Schreer, A. Smolic, and R. Tanger) and "3*d video: Acquisition, coding, and display*" in International Conference on Consumer Electronics (ICCE), Digest of Technical Papers, 2010, pp. 127-128 (P. Merkle, K. Muller, and T. Wiegand). For example, a 3D video can be encoded in multi-view plus depth, where a few views are used with the depth map to create more virtual views. The two references [Kauff 2007] and [Merkle 2010] present different ways of encoding and rendering 3D videos but they do not present methods to create depth signatures from stereo or multi-view videos.

WO9906956 discloses a method for recovering a 3D image or model from 2D views incorporating a depth labelling process which constructs a depth map applicable to the 3D image/model. WO07148219 also discusses converting from 2D image sequences to 3D.

WO04006168 relates to interleaving or embedding a fingerprint or watermark within a media stream such as a video image sequence or plurality of image frames. The fingerprinting step alters, as imperceptibly to a human user as possible, the original movie to produce a watermarked/fingerprinted media stream.

JP2010057105 discloses a mechanism for comparing depth signals and, on the basis of a difference in depth signals, identifying a boundary between objects being viewed so as to track those objects.

WO9815915 discloses an object tracking/identifying technology using depth information to distinguish between objects in the same image.

US2011/0064262 discloses a method and system for watermarking 3D content which tries to protect 3D videos (videos consist of a base view and an enhancement view) by identifying regions in base and/or enhancement pictures that are not referenced by other pictures in the compressed 3D video. Then, these regions are watermarked and transmitted. Receivers of water-marked videos extract and verify the embedded watermarks.

Disclosures relating to 2D video copy detection are not applicable to 3D videos, since 2D videos have no notion of depth. US2008/0313140 discloses a method and apparatus for multi-dimensional content search and video identification which utilises multidimensional databases and indexes to search different structures such as videos. To do this, a compact hash of multidimensional vector signatures is used as the traversal index. For video search applications, global and local signatures around key points are used as discriminative information of the videos. To find matches, a likelihood score based on frame similarity is computed between the frames of a query video and original videos. Then, a correlation between the query video and original videos is generated by using a change in signatures of each sequence of frames in the query video and original videos.

US2008/0178302—Determination of originality of content—this disclosure uses video fingerprints to determine 2D video copies.

If a depth signal is explicitly given as in video plus depth and multi-view plus depth formats, then a depth signature can be directly computed from the depth signal. Currently, the most common method for encoding 3D videos is stereo coding. This is the method used in coding 3D videos in almost all 3D cinemas and YouTube. Multi-view videos are extensions of stereo videos, in which more views are added to enhance a viewer's experience. There is no mechanism for creating depth signatures directly from stereo and multi-view 3D images, particularly videos, without requiring a depth signal.

It is an object of the present invention to seek to provide a method and system for creating depth signatures (or fingerprints) from stereo and multi-view 3D images, particularly videos. A method of creating depth signatures from 3D videos without the need for a depth signal is disclosed.

According to one aspect of the present invention, there is provided a method of creating a signature from plural images for providing watermark information related to the images, the method comprising: analysing a pair of images, each image containing a plurality of elements; identifying a first element in one of the pair of images; identifying plural elements in the other of the pair of images; measuring a disparity parameter between the first element and a set of the plural elements; matching the first element with a second element from the set of plural elements, the matched second element having the smallest measured disparity parameter; and computing a signature based at least in part on the measured disparity between the first element and the second element.

According to another aspect of the present invention, there is provided a method of creating a signature from plural images for providing watermark information related to the images, the method comprising: analysing a pair of images, each image containing a plurality of elements; identifying a first element in one of the pair of images; identifying the same first element in the other of the pair of images; measuring a disparity parameter between the two elements; and computing a signature based at least in part on the measured disparity between the two elements.

Preferably, the method further comprises: dividing each image into at least one sub-area, the set of plural elements comprising the elements in the at least one sub-area.

Conveniently, the measured disparity parameters provide a disparity map of the pair of images.

Advantageously, the element is a visual descriptor.

Preferably, the visual descriptor is a location visual descriptor.

Conveniently, the descriptor is derived using one or a combination of: SURF (Speeded Up Robust Feature); and SIFT (Scale-Invariant Feature Transform); and a colour histogram.

Advantageously, the result is a set of descriptors for each image.

Preferably, the signature comprises plural measured disparity parameters.

Conveniently, the signature comprises a vector of plural measured disparity parameters.

Advantageously, the images contain a depth signal and the signature is a depth signature.

Preferably, the depth signature is computed without computing a depth signal and without reference to any depth signal or depth information which may be associated with the images.

Conveniently, the pair of images comprise substantially consecutive or adjacent frames of a sequence of images and the measured disparity parameter is a result of object motion in the image camera motion, the resultant signature comprising a motion signature.

Advantageously, the method further comprises: modulating a signature to encode further information into the signature.

According to a further aspect of the present invention, there is provided a system for creating a signature from plural images for providing watermark information related to the images, the system comprising: an analyser module configured to analyse a pair of images, each image containing a plurality of elements; an identification module configured to identify a first element in one of the pair of images and plural elements in the other of the pair of images; a disparity measurement module configured to measure a disparity parameter between the first element and a set of the plural elements; a comparison module configured to match the first element with a second element from the set of plural elements, the matched second element having the smallest measured disparity parameter; and a signature generation module configured to compute a signature based at least in part on the measured disparity between the first element and the second element.

According to a yet further embodiment of the invention, there is provided a system for creating a signature from plural images for providing watermark information related to the images, the system comprising: an analyser module configured to analyse a pair of images, each image containing a plurality of elements; an identification module configured to identify a first element in one of the pair of images and to identify the same first element in the other of the pair of images; a disparity measurement module configured to measure a disparity parameter between the two elements; and a signature generation module configured to compute a signature based at least in part on the measured disparity between the two elements.

Preferably, the disparity measurement module is configured to utilise the measured disparity parameters to provide a disparity map of the pair of images.

Conveniently, the element is a visual descriptor.

Advantageously, the visual descriptor is a location visual descriptor.

Preferably, the descriptor is derived using one or a combination of: SURF (Speeded Up Robust Feature); and SIFT (Scale-Invariant Feature Transform); and a colour histogram.

Conveniently, the system is configured to generate a set of descriptors for each image.

Advantageously, the signature comprises plural measured disparity parameters.

Preferably, the signature comprises a vector of plural measured disparity parameters.

Conveniently, the images contain a depth signal and the signature is a depth signature.

Advantageously, the system is configured to generate the depth signature without computing a depth signal and without reference to any depth signal or depth information which may be associated with the images.

Preferably, the pair of images comprises substantially consecutive or adjacent frames of a sequence of images and the measured disparity parameter is a result of object motion in the image camera motion, the resultant signature comprising a motion signature.

Conveniently the system further comprises: an encoding module configured to modulate a signature to encode further information into the signature.

The signature is preferably used in a copy detection and prevention system.

According to another aspect of the present invention, there is provided a copy detection and prevention system comprising a system for creating a signature according to any one of claims 15 to 27.

In another embodiment, the signature is used in a video or image search engine.

According to a further aspect of the present invention, there is provided a video or image search engine comprising a system for creating a signature according to any one of claims 15 to 27.

Preferably, the video or image search engine comprises a look-up table storing information relating to at least one video or image and a computed signature corresponding to the or each respective video or image.

In another embodiment, the signature is used in a video de-duplication system, the video de-duplication system using the signature as a mechanism for data compression.

According to another aspect of the present invention, there is provided a video de-duplication system comprising a system for creating a signature according to any one of claims 15 to 27, wherein the system is configured to use the signature as a mechanism for data compression.

In a further embodiment, the signature is used in a video watermarking system, the system using the uniqueness of the signature or pattern of signatures or signature at particular frame numbers.

According to a still further aspect of the present invention, there is provided a video watermarking system comprising the system of any one of claims 15 to 27, wherein the video watermarking system is configured to use the uniqueness of the signature or pattern of signatures or signatures at particular frame numbers.

In a further embodiment, the signature is used to authenticate and verify video.

According to another aspect of the present invention, there is provided a system to authenticate and verify video comprising the system for creating a signature according to any one of claims 15 to 27.

In a further embodiment, the signature is used in source-provenance detection and other forms of digital rights management.

According to another aspect of the present invention, there is provided a source-provenance detection for other digital rights management system comprising the system for creating a signature according to any one of claims 15 to 27.

According to a further aspect of the present invention, there is provided a signature comprising a data packet, the signature containing a measured disparity between a first element and a second element from a pair of images.

Preferably, the signature is a depth signature.

In order that the present invention may be more readily understood, embodiments thereof will now be described, by way of example, with reference to the accompanying drawings, in which.

Embodiments of the system and method operate on stereo and multi-view images and videos which do not have depth signals. The creation of a depth signature from such images is much harder than from images such as video plus depth formats because depth signals are not explicitly given.

A mechanism for creating depth signatures (or fingerprints) from stereo and multi-view 3D videos is discussed. The creation of this parameter—the depth signature—exploits the inherent differences between a pair of 3D video frames, normally a left view and a right view of object(s) in the same image. Coincident or consecutive image frames can be analysed.

Importantly, in embodiments of the invention, the method and system creates depth signatures without computing a depth signal and without reference to any depth signal or depth information which may be associated with the images or video. There are disadvantages associated with computing a depth signal, not least that it is computationally expensive. Being able to create a depth signature without first having to compute a depth signal offers a distinct technical benefit.

A system and method for creating a depth signature is one embodiment of the invention. Note that it is not essential that the images or video from which the depth signature is to be calculated do not have a depth signal associated with them, just that the depth signal, if present, does not need to be derived, read or used in the computation of the depth signature for those images or video.

Other aspects of the invention comprise the applications to which a depth signature can be used. Embodiments of the present invention use the derived parameter of the depth signature from the images or video in at least the following applications: video or image copy detection, video or image copy prevention, video or image search engines, video de-duplication systems, video authentication and verification systems, source-provenance detection and other forms of digital rights management, and video watermarking systems.

Embodiments of the present invention exploit the naturally occurring differences that exist between "left" and "right" images (pairs of images of the same scene from different perspectives) used in stereo and multi-view images and videos to establish a 3D image. The differences between the image pairs are used as a springboard to create a parameter or fingerprint which allows that parameter to be used as a unique identifier for the image pair, a depth signature. Preferably, the difference between pairs of images comprises the difference in location in the image of the same scene of one element between a first image and a second image (usually a "left" and a "right" image). An element in the image which "shifts" location between the pair of images is just one form of visual descriptor. The difference or shift in location of the visual descriptor is measured and this measure is the main component of the depth signature.

Visual descriptors describe the features of an image. For example, visual descriptors describe the location of elements in the image in the spatial domain. Preferably embodiments of the present invention use location visual descriptors although other descriptors can be used such as shape and motion descriptors or combinations of all three to track any shift in location of an image element.

The depth signature is calculated by conducting a matching process to identify the same visual descriptor in a pair of images and calculate a disparity measure between them.

Embodiments of the invention comprise a system and method to create a depth signature, a signature of the depth signal, without deriving, computing, reading or with reference to the depth signal itself. The resultant signature is characteristic of and a unique identifier for the pair of frames or the series of pairs of frames from which it was derived and can therefore be used as a fingerprint or a watermark to identify the pair of frames or the series of representative pairs of frames, i.e. a video, a video clip, an entire movie. The use of a depth signature where the pair of images contain depth information (or what is perceived as depth information by the human brain) presents a watermark which is particularly useful for application to stereo or multi-view images or videos for creating 3D perception.

Depth signatures are an ideal way to provide watermark information on 3D videos or images without having to alter any of the images. Traditional watermarking involves the application of subtle changes to media data which cannot be perceived by the human eye or ear but which are sufficient to convey watermarking information. Traditional watermarking techniques execute a fine balance between applying a robust and detectable watermark by altering the media to which the watermark is applied and taking care not to alter the media by too great a degree that the watermarking becomes visible or audible. The watermark information created by the embodiments of the present invention does not alter the medium of the 3D image or video.

In embodiments of the present invention, the watermark information provided by the signature can be expanded by modulating the signature to encode further information into the signature. The modulated signature can be demodulated/decoded to return the further information and the depth signature.

A pair of images of the same scene, potentially from different perspectives to give depth to the composite image, are analysed using stereo correspondence. Stereo correspondence identifies which parts of an image correspond to which parts of another image. For example, "*Stereo correspondence*" in Computer Vision, ser. Texts in Computer Science. Springer London, 2011, pp. 467-503, R. Szeliski discusses methods to find corresponding parts in different images but does not present any methods for creating signatures.

Using stereo correspondence, a disparity map is created between the pair of images. A disparity map for a pair of images describes what displacement each pixel has to move from one image into the correct position in the other image of the pair. The generated disparity map is inversely proportional to the depth map as the disparity is larger for objects near to the camera than for objects far away from the camera.

The input to one embodiment of the present invention is a 3D video encoded in stereo format. For multi-view formats, signatures are created for each pair of views. The depth signature output is preferably expressed as a vector representing the depth signature of the video. The vector has an element for each video frame.

Sub-sampling of frames can also be used in which only signatures of a subset of the frames are created. Each element in the signature has multiple dimensions. The values of the dimensions of each element are based on the disparity between the left and right images of the video frame corresponding to this element in the signature vector.

A stereo 3D video is composed of two views (left view for left eye and right view for right eye). Each view is a stream of frames which correspond to frames in the other view. A depth signature is computed for each pair of frames that correspond with other in the two views. Sub-sampling can also be applied in which depth signatures are computed only for a subset of frames, e.g., every tenth frame.

Figure 1:
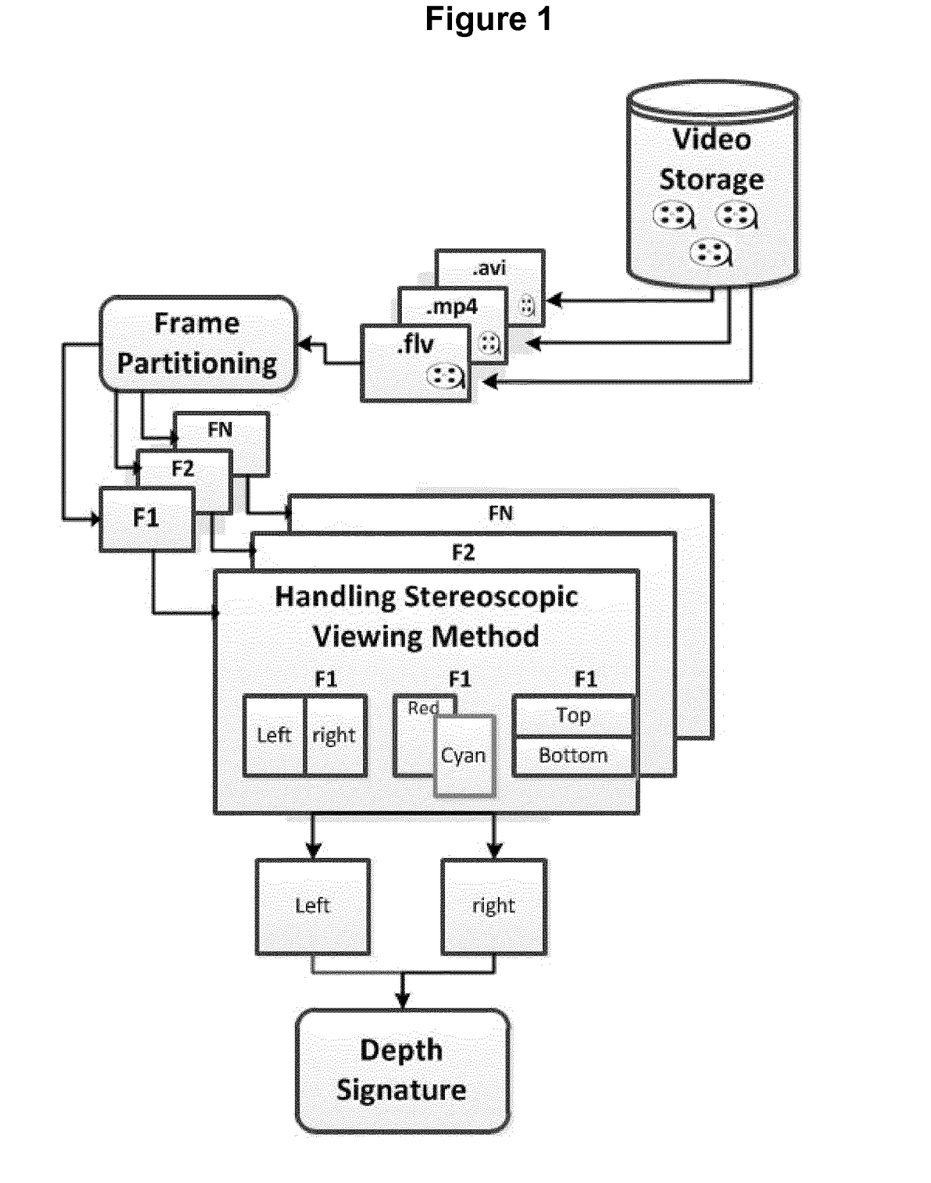
FIG. 1 is a schematic flow diagram showing a system embodying the present invention and the steps of video processing leading to creation of a depth signature.

Referring to FIG. 1, this shows the steps of processing a stereo 3D video to achieve a depth signature. FIG. 1 shows the operations performed on the video for depth signature computation. These operations are summarised as follows:

Step 1: Read Video: different format types can be handled in this step, for example videos formatted in .flv, .mp4, .mpg, .avi, and others can be handled.

Step 2: Frame Partitioning: each of the above file formats stores the encoding method of the video frames so for each encoding method the video is decoded into its raw bitmap frames or images. The video is decoded in the memory to decrease the overhead of multiple I/O. Alternatively, the video is decoded a small number frames at a time for efficient use of the memory.

Step 3: Handling Stereoscopic Viewing Method: there are different methods for generating a stereoscopic view so videos downloaded from video hosting Websites (e.g. Youtube) can be compiled in a set of different viewing methods. Examples of these viewing methods are:

Side By Side: the width of the frame is double that of either left or right, and the left and right frames are stacked with each other horizontally such that the left half of the frame is the left view and the right half is the right view Top Bottom: the width of the frame is double that of either left or right, and the left and right frames are stacked with each other vertically such that the top half of the image is the left view and the bottom half is the right view Red Cyan: The frame is composed of two views interleaved with each other, one view is in red color and the other is in cyan, certain goggles are used in this type to distinguish between left and right views while viewing the video In an embodiment of the invention, each of these viewing methods is converted into a pair of separate frames/images; a "left" frame and a "right" frame.

Figure 2:
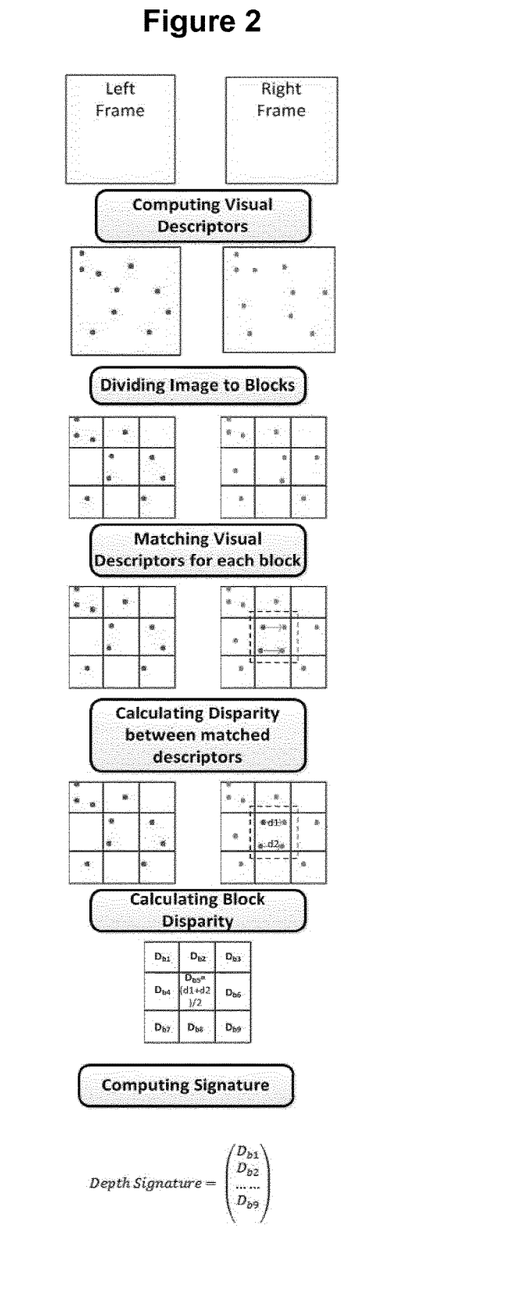
FIG. 2 is a schematic flow chart illustrating the steps for creating a depth signature in accordance with an embodiment of the present invention.

The method of an embodiment of the present invention computes a depth signature using both left and right frames to compute the signature. The method of an embodiment of the present invention comprises the following steps:

Input: two frames corresponding to each other in the two views. These are referred to as left frame and right frame.

Output: depth signature of the two frames (concatenation of individual signatures of pair of frames yield signature for the whole video)

Step 1: Compute Visual Descriptors for Left and Right Images.

Different types of descriptors can be used including, SURF (Speeded Up Robust Feature) and SIFT (Scale-Invariant Feature Transform). In addition, simpler descriptors, e.g., colour histograms, can also be used. The result is a set of descriptors for each image. The number of descriptors per image is controllable through certain parameters in the descriptor computation method. The number of descriptors in the left image is denoted by $L_n$, and the number of descriptors in the right image is denoted by $R_n$. Each descriptor has a fixed number of dimensions or features. The number of features in each descriptor is denoted by F. For example, each SURF descriptor has 64 dimensions, i.e., F=64. Each descriptor i is computed at a specific pixel in the image, which has a location of $(x_i, y_i)$.

Therefore, the result of this step is:

$$\text{Descriptor}_i^L = \begin{pmatrix} f_{i1} \\ f_{i2} \\ f_{i3} \\ \vdots \\ f_{iF} \end{pmatrix}, \text{Position}_i^L = (x_i, y_i), i = 1, 2, \ldots, L_n$$

$$\text{Descriptor}_i^R = \begin{pmatrix} f_{i1} \\ f_{i2} \\ f_{i3} \\ \vdots \\ f_{iF} \end{pmatrix}, \text{Position}_i^R = (x_i, y_i), i = 1, 2, \ldots, R_n$$

Figure 3:
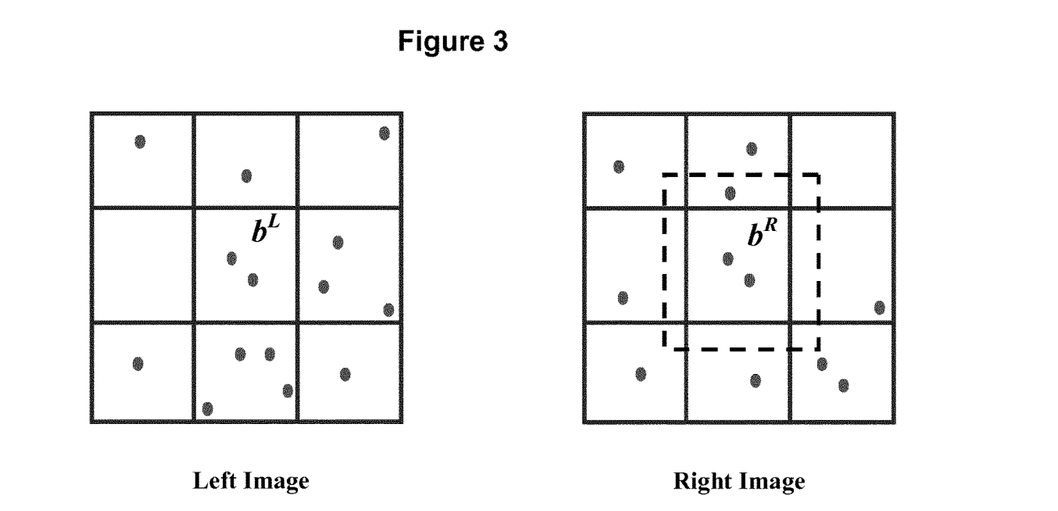
FIG. 3 is a schematic illustration of image blocking for use with an embodiment of the present invention.

Step 2: Divide Each Image into Blocks.

Both left and right images are divided into the same number of blocks. In general, blocks can be of different sizes and each can be a square or another geometrical shape. In this embodiment, equal sized blocks are used, i.e. squares. Thus, each image is divided into N×M blocks. This is illustrated in FIG. 3. The dots in the blocks are schematic representations of the visual descriptors that fall into these blocks. The numbers of descriptors in different blocks vary because descriptors depend on the visual objects contained in the blocks. FIG. 3 shows two matching blocks in left and right images based on descriptors.

Step 3: Match Visual Descriptors.

The closest descriptor in the right image is found for each visual descriptor in the left image. This is based on the distance between descriptors, which is computed as follows:

$$\text{Descriptor}_i^L - \text{Descriptor}_j^R = \sqrt{(f_{i1}-f_{j1})^2 + \ldots + (f_{iF}-f_{jF})^2}.$$

where $\text{Descriptor}_i^L$ is descriptor i in the left image which has features $f_{i1}, f_{i2}, \ldots, f_{iF}$, and $\text{Descriptor}_j^R$ is descriptor j in the right image which has features $f_{j1}, f_{j2}, \ldots, f_{jF}$.

For each descriptor in the left image, the distance between it and every descriptor in the right image is computed within a target block. The descriptor in the right image with the smallest distance (the closest descriptor) is selected to be the matching pair for the descriptor in the left image.

Another embodiment of the present invention, rather than using the closest descriptor methodology, matches and identifies the same descriptor in the two images and then measures the distance between the matched descriptors.

Step 4: Determine target block.

To determine the target block for a descriptor in the left image, it is necessary to consider the block in which that descriptor is located. The corresponding block (that has the same x,y position) in the right image is identified and a larger block is drawn around that block. This is shown in FIG. 3 for the block labeled $b^L$ and $b^R$ in the left and right images, respectively. The additional size added to create the larger block is a control parameter Δ, which takes the range of 0% to about 30% of the original block size. This is done to account for any slight changes in the visual objects between the left and right views.

Step 5: Compute Block Disparity.

The block disparity is computed between each block in the left image and its corresponding block in the right image. Block disparity is computed as the average disparity of all visual descriptors in that block.

The disparity of a visual descriptor i (in the left view) is the difference between that descriptor and the closest descriptor j in the right view. The disparity is computed as:

$$\text{Disparity}_i = \sqrt{\left(\frac{(x_i^2 - x_j)}{W}\right)^2 + \left(\frac{(y_i^2 - y_j)}{H}\right)^2},$$

where $x_i$ and $y_i$ are the position of descriptor i in the left image; $x_j$ and $y_j$ are the position of descriptor j in the right image; W is the width of the image; and H is the height of the image. The disparity is normalised by dividing by W and H to mitigate for the possible scaling of images.

If a block does not have any descriptor or its corresponding block in the right image does not have any descriptor, the disparity is set to 0.

Step 6: Compute Depth Signature.

The depth signature of two corresponding images is given by:

$$\text{Depth Signature} = \begin{pmatrix} \text{Disparity}_{Block\ 1} \\ \text{Disparity}_{Block\ 2} \\ \ldots \\ \text{Disparity}_{Block\ NxM} \end{pmatrix},$$

where $\text{Disparity}_{Block\ i}$ is the disparity of block i, which is computed as the average of the disparities of all descriptors in that block.

The present invention has particular application to stereo and multi-view images and videos where pairs of images are provided and a 3D image can be recreated from such a pair of images. A signature similar to a depth signature can be derived from other pairs of images which do not "include" depth, for example, from a pair consecutive frames of a 2D video. The image in consecutive frames of a 2D video changes only slightly because of object movement or camera movement. A disparity map can be produced for a pair of consecutive frames of a 2D video in a similar fashion to the disparity map for a pair of "left" and "right" images but the disparity is not caused by depth or a representation of depth but is caused by movement of objects in the image (activity motion) or movement of the camera (camera motion). The generated disparity map is used to produce a "motion" signature which can be unique to a pair of frames or a series of pairs of frames.

Figure 4:
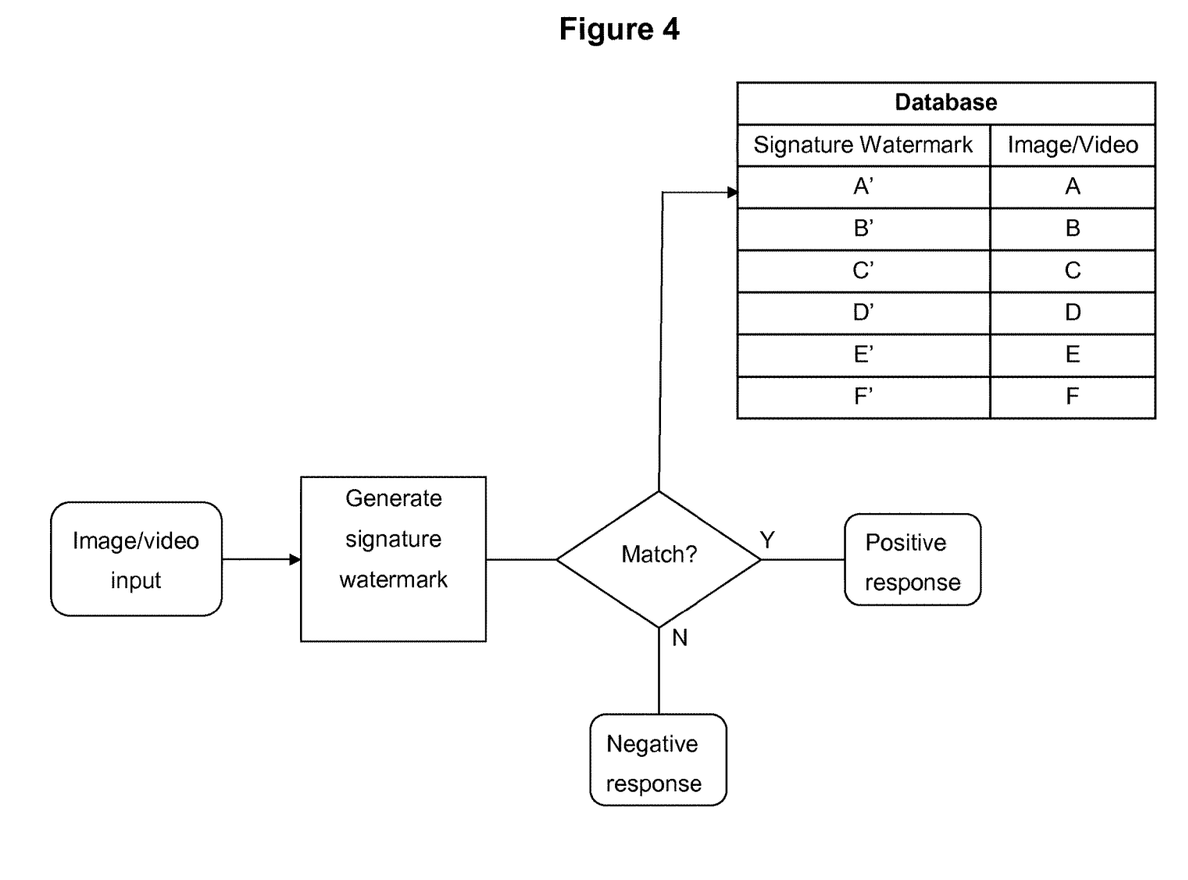
FIG. 4 is a schematic flow diagram showing a system embodying one embodiment of the present invention in which a signature watermark generated from an input image or video is matched with a signature watermark in a database.

Referring to FIG. 4, a system in accordance with one embodiment of the invention incorporates a database which comprises a look-up table which stores information about an image or video, such as the title of the image or video. The information is stored alongside a previously generated signature watermark for each respective image or video. The look-up table shown in FIG. 4 stores information about six different images/videos A-F and the signature watermarks A'-F' corresponding to those six images/videos. However, it is to be appreciated that in other embodiments of the invention, the look-up table may store information and signature watermarks corresponding to any number of images or videos.

The system shown in FIG. 4 is configured to operate as an identification system to identify information about an input image or video. Initially, an image or video is input to the system and the image or video is analysed using one of the methods described above to generate a signature watermark for the image/video. The generated signature watermark is then compared in turn with each signature watermark stored in the look-up table.

If the generated signature watermark is found to match one of the signature watermarks stored in the database then the system outputs a positive response. The positive response could, for instance, include the information about the image or video taken from the database. The positive response could also indicate that the input image or video is legitimate since its signature watermark matches one of the official signature watermarks stored in the database.

If the generated signature watermark does not match one of the signature watermarks stored in the database then the system outputs a negative response. The negative response could indicate that no match was found. The negative response could also indicate that the input image or video is an unauthorised copy since the signature watermark does not match one of the official signature watermarks stored in the database.

The system shown in FIG. 4 can be used at least in the following applications: video copy detection, video search engines or video de-duplication systems.

When used in this specification and claims, the terms "comprises" and "comprising" and variations thereof mean that the specified features, steps or integers are included. The terms are not to be interpreted to exclude the presence of other features, steps or components.

The invention claimed is:

1. A method of creating a signature from plural images for providing watermark information related to the images, the method comprising:

analysing a pair of images from the plural images, each image of the pair of images containing a plurality of elements, the plurality of elements including at least one of a visual descriptor, a shape descriptor, a location descriptor, and a motion descriptor;

identifying a first element in one image of the pair of images;

identifying plural elements in the other image of the pair of images;

dividing each image into a plurality of blocks, the plural elements comprising elements in at least one of the plurality of blocks;

determining a first target block for the first element in the one image of the pair of images;

matching the first element in the one image of the pair of images with a second element from the plural elements in the other image of the pair of images, the matched second element having the smallest measured distance between the first element and the second element within a second target block of the other image of the pair of images;

measuring a disparity parameter ($Disparity_i$) between the first element and the matched second element using equation $$Disparity_i = \sqrt{\left(\frac{(x_i - x_j)}{W}\right)^2 + \left(\frac{(y_i - y_j)}{H}\right)^2},$$

$x_i$ and $y_i$ being the position of the first element in the one image of the pair of images, $x_j$ and $y_j$ being the position of the matched second element in the other image of the pair of images, W being the width of the one image of the pair of images, H being the height of the one image of the pair of images;

computing a signature by averaging the measured disparity parameter between the first element and the matched second element and a second measured disparity parameter, the second measured disparity parameter being measured between another element in the one image of the pair of images with another element from the plural elements in the other image of the pair of images, the computing of the signature being performed without reference to any depth signal or depth information, the signature being a vector comprising the average measured disparity parameter for each of the plurality of blocks and being a unique identifier for the pair of images; and utilizing the signature to identify the pair of images without altering the pair of images with the signature, the signature being compared to a known signature in the identifying the pair of images.

2. A method of creating a signature from plural images for providing watermark information related to the images, the method comprising:

analysing a pair of images from the plural images, each image of the pair of images containing a plurality of elements, the plurality of elements including at least one of a visual descriptor, a shape descriptor, a location descriptor, and a motion descriptor;

identifying a first element in one image of the pair of images;

identifying a second element in the other image of the pair of images, the second element corresponding to the first element in the one image of the pair of images;

dividing each image into a plurality of blocks, the second element in the other image being in at least one of the plurality of blocks;

determining a first target block for the first element in the one image of the pair of images, the second element in the other image being within a second target block of the other image of the pair of images;

measuring a disparity parameter ($Disparity_i$) between the two elements using equation $$Disparity_i = \sqrt{\left(\frac{(x_i - x_j)}{W}\right)^2 + \left(\frac{(y_i - y_j)}{H}\right)^2},$$

$x_i$ and $y_i$ being the position of the first element in the one image of the pair of images, $x_j$ and $y_j$ being the position of the second element in the other image of the pair of images, W being the width of the one image of the pair of images, H being the height of the one image of the pair of images;

computing a signature by averaging the measured disparity parameter between the two elements and a second measured disparity parameter, the second measured disparity parameter being measured between another element in the one image of the pair of images with another element in the other image of the pair of images, the computing of the signature being performed without reference to any depth signal or depth information, the signature being a vector comprising the average measured disparity parameter for each of the plurality of blocks and being a unique identifier for the pair of images; and utilizing the signature to identify the pair of images without altering the pair of images with the signature, the signature being compared to a known signature in the identifying the pair of images.

3. A method according to claim 1, wherein the method further comprises:

dividing each image into at least one sub-area, the plural elements comprising elements in the at least one sub-area.

4. A method according to claim 1, wherein the first element is a visual descriptor.

5. A method according to claim 4, wherein the visual descriptor is a location visual descriptor.

6. A method according to claim 4, wherein the visual descriptor is derived using one or a combination of: SURF (Speeded Up Robust Feature); and SIFT (Scale-Invariant Feature Transform); and a colour histogram.

7. A method according to claim 1, resulting in a set of descriptors for each image.

8. A method according to claim 1, wherein the signature comprises plural measured disparity parameters.

9. A method according to claim 1, wherein the signature comprises a vector of plural measured disparity parameters.

10. A method according to claim 1, wherein the images contain a depth signal and the signature is a depth signature.

11. A method according to claim 1, wherein the method further comprises:
modulating the signature to encode further information into the signature.

12. A system for creating a signature from plural images for providing watermark information related to the images, the system comprising:
a processor configured to:
analyse a pair of images from the plural images, each image of the pair of images containing a plurality of elements, the plurality of elements including at least one of a visual descriptor, a shape descriptor, a location descriptor, and a motion descriptor;
identify a first element in one image of the pair of images and plural elements in the other image of the pair of images;
divide each image into a plurality of blocks, the plural elements comprising elements in—at least one of the plurality of blocks;
determine the first target block for the first element in the one image of the pair of images;
match the first element in the one image of the pair of images with a second element from the plural elements in the other image of the pair of images, the matched second element having the smallest measured distance between the first element and the second element within a second target block of the other image of the pair of images;
measure a disparity parameter (Disparity$_i$) between the first element and the matched second element using equation $$\text{Disparity}_i = \sqrt{\left(\frac{(x_i - x_j)}{W}\right)^2 + \left(\frac{(y_i - y_j)}{H}\right)^2},$$

x$_i$ and y$_i$ being the position of the first element in the one image of the pair of images, x$_j$ and y$_j$ being the position of the matched second element in the other image of the pair of images, W being the width of the one image of the pair of images, H being the height of the one image of the pair of images;
compute a signature by averaging the measured disparity parameter between the first element and the matched second element and a second measured disparity parameter, the second measured disparity parameter being measured between another element in the one image of the pair of images with another element from the plural elements in the other image of the pair of images, the computing of the signature being performed without reference to any depth signal or depth information, the signature being a vector comprising the average measured disparity parameter for each of the plurality of blocks and being a unique identifier for the pair of images; and
utilize the signature to identify the pair of images without altering the pair of images with the signature, the signature being compared to a known signature in the identifying the pair of images.

13. A system for creating a signature from plural images for providing watermark information related to the images, the system comprising:
a processor configured to:
analyse a pair of images from the plural images, each image of the pair of images containing a plurality of elements, the plurality of elements including at least one of a visual descriptor, a shape descriptor, a location descriptor, and a motion descriptor;
identify a first element in one image of the pair of images;
identify a second element in the other image of the pair of images, the second element corresponding to the first element in the one image of the pair of images;
divide each image into a plurality of blocks, the second element in the other image being in at least one of the plurality of blocks;
determine a first target block for the first element in the one image of the pair of images, the second element in the other image being within a second target block of the other image of the pair of images;
measure a disparity parameter (Disparity$_i$) between the two elements using equation $$\text{Disparity}_i = \sqrt{\left(\frac{(x_i - x_j)}{W}\right)^2 + \left(\frac{(y_i - y_j)}{H}\right)^2},$$

x$_i$ and y$_i$ being the position of the first element in the one image of the pair of images, x$_j$ and y$_j$ being the position of the second element in the other image of the pair of images, W being the width of the one image of the pair of images, H being the height of the one image of the pair of images;
compute a signature by averaging the measured disparity between the two elements and a second measured disparity parameter, the second measured disparity parameter being measured between another element in the one image of the pair of images with another element in the other image of the pair of images, the computing of the signature being performed without reference to any depth signal or depth information, the signature being a vector comprising the average measured disparity parameter for each of the plurality of blocks and being a unique identifier for the pair of images; and
utilize the signature to identify the pair of images without altering the pair of images with the signature, the signature being compared to a known signature in the identifying the pair of images.

14. A system according to claim 12, wherein the first element is a visual descriptor.

15. A system according to claim 14, wherein the visual descriptor is a location visual descriptor.

16. A system according to claim 14, wherein the visual descriptor is derived using one or a combination of: SURF (Speeded Up Robust Feature); and SIFT (Scale-Invariant Feature Transform); and a colour histogram.

17. A system according to claim 12, wherein the system is configured to generate a set of descriptors for each image.

18. A system according to claim 12, wherein the signature comprises plural measured disparity parameters.

19. A system according to claim 12, wherein the signature comprises a vector of plural measured disparity parameters.

20. A system according to claim 12, wherein the images contain a depth signal and the signature is a depth signature.

21. A system according to claim 12, wherein the processor is further configured to modulate the signature to encode further information into the signature.

22. The method of claim 1, further comprising using the signature in a copy detection and prevention system.

23. The system for creating a signature according to claim 12, further comprising using the signature in a copy detection and prevention system.

24. The method of claim 1, further comprising using the signature in a video or image search engine.

25. The system for creating a signature according to claim 12, for use in a video or image search engine.

26. The system according to claim 25, wherein the video or image search engine comprises a look-up table storing information relating to at least one of a video and an image, and a computed signature corresponding to the at least one of a respective video and an image.

27. The method of claim 1, further comprising using the signature in a video de-duplication system, the video de-duplication system using the signature as a mechanism for data compression.

28. The system for creating a signature according to claim 12, wherein the system is configured to use the signature as a mechanism for data compression in a video de-duplication system.

29. The method of claim 1, further comprising using the signature in a video watermarking system, the system using the uniqueness of the signature or a pattern of signatures or signatures at particular frame numbers.

30. The system of claim 12 for use in a video watermarking system, wherein the video watermarking system is configured to use the uniqueness of the signature or a pattern of signatures or signatures at particular frame numbers.

31. The method of claim 1, further comprising using the signature to authenticate and verify video.

32. The system for creating a signature according to claim 12 for use to authenticate and verify video.

33. The method of claim 1, further comprising using the signature in source-provenance detection and other forms of digital rights management.

34. The system for creating a signature according to claim 12 for use in source-provenance detection and other forms of digital rights management system.

* * * * *